A. DALTON.
WATER HEATING DEVICE.
APPLICATION FILED MAR. 3, 1917.
1,249,343.
Patented Dec. 11, 1917.
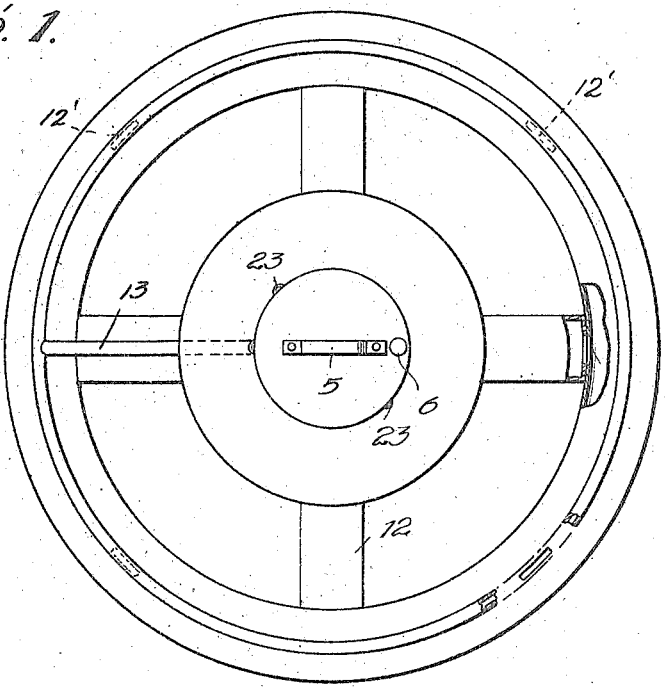
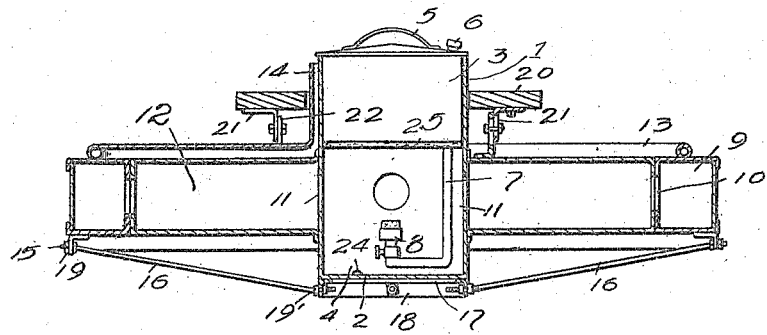
Albertus Dalton,
Inventor
By Geo. P. Kimmel
Attorney

UNITED STATES PATENT OFFICE.

ALBERTUS DALTON, OF FARMINGTON, ILLINOIS.

WATER-HEATING DEVICE.

1,249,343.  Specification of Letters Patent.  Patented Dec. 11, 1917.

Application filed March 3, 1917. Serial No. 152,368.

*To all whom it may concern:*

Be it known that I, ALBERTUS DALTON, a citizen of the United States, and resident of Farmington, in the county of Fulton and State of Illinois, have invented certain new and useful Improvements in Water-Heating Devices, of which the following is a specification.

This invention relates to the class of devices used in heating water for stock or for domestic purposes, and its object is to provide a heating device which may be used with equal facility in different depths of water.

My invention comprises a heating chamber having heat conveying conduits extending outwardly therefrom and of an adjustable float means associated with the heating chamber permitting a variation in the distance of the heating conduits from the upper surface of the water.

A further object of the invention is to provide an apparatus of the class described, in which the parts thereof are closely assembled, and combined, thereby taking up a minimum amount of space and rendering the device especially applicable for operation in confined places.

Other improvements and novel details in the construction and arrangement of the several parts of the apparatus will be brought out more in detail in the description to follow, which, for a clear understanding of the invention, should be considered in connection with the accompanying drawing, forming a part hereof, and wherein is disclosed, for the purpose of illustration, convenient and satisfactory embodiments of the invention. It is to be noted, in this connection, that minor changes in the construction and arrangement of the various parts may be made without departing from the spirit of the invention or the principle of operation of the various parts.

In the drawing:

Figure 1 is a top plan view of my invention, part thereof being fragmentary, and Fig. 2 is a longitudinal sectional view of the same.

Corresponding and like parts are referred to in the following description and indicated in all the views of the drawing by the same reference characters.

My invention comprises a vertically mounted sleeve member designated 1 having the lower end 2 thereof closed. In the upper section of said sleeve member a fuel receptacle 3 is formed therein thus forming a heating chamber 4 intermediate the bottom of the sleeve member and the fuel receptacle. A handle 5 is formed on the fuel receptacle providing means for removing the said receptacle from the sleeve when so desired. A cap member 6 is provided on the upper portion of the said receptacle to provide means for refilling the same.

A pipe 7 extends downwardly from the fuel receptacle and is provided adjacent its end with a burner 8 for an obvious purpose. A sheet metal heat retaining chamber rectangular in cross section but of a circular configuration is provided having the heat retaining chamber concentrically arranged therein. The heat retaining chamber designated 9 is provided with apertures 10 forming an inlet means that will be hereinafter described. Outlet apertures 11 are provided in the sides of the vertically extending sleeve member adjacent the heat chamber providing outlet means for the heat which is conveyed to the circular heat retaining chamber by means of the radially extending heat conduits 12 connecting the said apertures. It is obvious that the heat of the burner will heat the oil or other fuel as may be used thus increasing its heating powers. The heat will be conveyed from the central heating chamber designated 4 through the apertures 11 to the circular heat retaining chamber 9. Openings 12' are provided in the upper portion of the circular heat retaining chamber. A circular pipe 13 is provided mounted over the circular heat retaining chamber and is provided with openings therein registering with the openings provided in the circular heat retaining chamber. The pipe 13 extends inwardly from the circular member and is provided with a lateral extension 14 conveying the heat to the uppermost part of the sleeve member thus providing means for the disbursement of the heat above the water line which will prevent any water from entering the heating chambers.

A circular angle iron 15 is mounted on the outer edge of the circular heat retaining chamber and is provided with apertures in its lower edges to receive rod members 16, the opposite ends of which are mounted in openings provided in a base plate 17 having a lateral extension 18. The free ends of the rods 16 are retained in the openings provided in the angle iron and in the lateral extension by means of the lock nuts 19 and 19'.

In order that the heating member may be retained in the desired depth in the water or other fluid to be heated I provide a float member 20 comprising a circular disk having a concentrical opening therein thus permitting the mounting of the float over the sleeve member. The said float is adjustably mounted on the radially extending heat conduits 12 by means of the coöperating angle irons 21, the said angle irons being provided with vertically extending openings therein permitting the adjustment of the same. A bolt member 22 extends through said openings and by means of the nut and head thereof provides means for retaining the same in the desired adjusted position.

Conduits 23 are mounted on the sides of the sleeve member providing means for conveying air to the heating chamber 4, thus aiding the combustion of the oil or other heating fuel. An opening 24 is provided on each side of the sleeve member adjacent the bottom thereof providing an inlet means for the air conveyed to the conduits 23. An asbestos sheet 25 is provided on the bottom of the fuel receptacles 3 to limit the heating of the fuel within the receptacle 3.

From the above description taken in connection with the accompanying drawing, it can be easily seen that I have provided a water heating device that is simple in construction, containing but a few simple parts that can be manufactured and assembled at a small cost.

Having thus fully described my invention, what I claim as new, and desire to secure by Letters Patent, is:

1. In a device of the class described the combination of a sleeve member having apertures therein, the lower end being closed forming a heating chamber, a fuel receptacle formed in the upper end of the sleeve member, a pipe extending from the said receptacle and provided with a burner, a circular heat retaining conduit, radially extending heat conduits connecting the heat chamber and the circular heat retaining conduit, a float adjustably mounted on the upper portion of the radially extending conduits, and means associated with said circular chamber permitting escapement of the heat.

2. In a device of the class described the combination of a vertically extending sleeve member having the lower ends thereof closed, a fuel receptacle formed in the upper end of said sleeve, a heating chamber, said sleeve having openings therein adjacent the heating chamber, a fuel conveying pipe having a burner on the end thereof extending from the fuel receptacle to the heating chamber, a circular heat retaining chamber having a plurality of openings therein, means associated with said openings to convey heat to the uppermost portions of the device, radially extending heat conduits connecting the said apertures and the circular heat retaining chamber, and a float member adjustably connected to the radially extending heat conduits for a purpose specified.

3. In a device of the class described the combination of a vertically extending sleeve member having openings provided intermediate its ends, a heat generating means formed within said sleeve, a circular heat retaining chamber, means for conveying heat from said sleeve member to the heat retaining chamber, a float member, and means associated with said float member for adjustably mounting the same to regulate the depth of the heat retaining chamber relative to the surface of the water.

In testimony whereof, I affix my signature hereto.

ALBERTUS DALTON.